(12) United States Patent
Nägele et al.

(10) Patent No.: US 11,017,007 B2
(45) Date of Patent: May 25, 2021

(54) DATA MANAGEMENT SYSTEM

(71) Applicant: ThePeople.de GmbH, Flein (DE)

(72) Inventors: Carl Michael Nägele, Flein (DE); Rudolf Andreas Fischer, Flein (DE)

(73) Assignee: THEPEOPLE.DE GMBH, Flein (DE)

( * ) Notice: Subject to any disclaimer, the term of this patent is extended or adjusted under 35 U.S.C. 154(b) by 523 days.

(21) Appl. No.: 15/887,397

(22) Filed: Feb. 2, 2018

(65) Prior Publication Data
US 2019/0050329 A1    Feb. 14, 2019

(30) Foreign Application Priority Data

Feb. 3, 2017    (DE) .................. 10 2017 102 125.6
Feb. 24, 2017    (DE) .................. 10 2017 103 824.8

(51) Int. Cl.
*G06F 17/00*    (2019.01)
*G06F 16/38*    (2019.01)
*G06F 16/14*    (2019.01)

(52) U.S. Cl.
CPC .......... *G06F 16/381* (2019.01); *G06F 16/152* (2019.01)

(58) Field of Classification Search
CPC combination set(s) only.
See application file for complete search history.

(56) References Cited

U.S. PATENT DOCUMENTS

| | | | | |
|---|---|---|---|---|
| 6,081,827 A * | 6/2000 | Reber | .................. | G06Q 20/04 709/200 |
| 9,913,003 B2 * | 3/2018 | Lloyd | .................. | G08B 21/02 |
| 10,187,317 B1 * | 1/2019 | Amdahl | .................. | H04L 47/39 |
| 10,417,121 B1 * | 9/2019 | Suhas | .................. | G06F 12/02 |
| 2005/0197903 A1 * | 9/2005 | Hoffman | .................. | G16H 40/67 705/2 |
| 2005/0200610 A1 * | 9/2005 | Skantze | .................. | G06F 3/0317 345/173 |
| 2005/0277405 A1 * | 12/2005 | Noguchi | .................. | H04N 1/00334 455/411 |
| 2007/0018002 A1 * | 1/2007 | Lapstun | .................. | G06K 19/06009 235/487 |

(Continued)

FOREIGN PATENT DOCUMENTS

| | | |
|---|---|---|
| EP | 2735976 A1 | 5/2014 |
| JP | 2010250622 | 4/2010 |

*Primary Examiner* — Hasanul Mobin
(74) *Attorney, Agent, or Firm* — Shlesinger, Arkwright & Garvey LLP (57) ABSTRACT

A method for allocating a memory location to a physical information carrier includes using an application executed on a portable processing unit; requesting the memory location on a server via a communication interface connected to the portable processing unit; allocating the memory location a unique identifier; allocating the unique identifier a pattern that is to be applied manually to a surface of the physical information carrier; applying the pattern by a user manually to the surface of the physical information carrier, whereby the memory location on the server is connected to the physical information carrier; if the pattern is captured while using a sensor of processing unit, downloading the allocation the memory location to the unique identifier from the server; and accessing the memory location via the portable processing unit by using the downloaded allocation.

12 Claims, 6 Drawing Sheets

(56) References Cited

U.S. PATENT DOCUMENTS

| | | | |
|---|---|---|---|
| 2011/0086616 A1* | 4/2011 | Brand | G06Q 20/425 |
| | | | 455/411 |
| 2012/0215552 A1* | 8/2012 | Goldschmidt | G06Q 10/10 |
| | | | 705/2 |
| 2013/0290442 A1* | 10/2013 | Dgani | G06Q 10/107 |
| | | | 709/206 |
| 2014/0016463 A1* | 1/2014 | Kitada | H04L 47/20 |
| | | | 370/230.1 |
| 2014/0141756 A1* | 5/2014 | Kirner | G06F 16/9554 |
| | | | 455/414.1 |
| 2015/0278449 A1* | 10/2015 | LaBorde | G16H 10/60 |
| | | | 705/3 |
| 2015/0319144 A1* | 11/2015 | Barton | G06F 9/485 |
| | | | 713/168 |
| 2016/0154750 A1* | 6/2016 | Park | G06F 3/0671 |
| | | | 711/153 |
| 2017/0236375 A1* | 8/2017 | Price | G07F 17/3241 |
| | | | 463/25 |
| 2018/0278807 A1* | 9/2018 | Miwa | H04N 1/00045 |

* cited by examiner

DATA MANAGEMENT SYSTEM

FIELD OF THE INVENTION

The presented invention pertains to a method for allocating at least one digital memory location to a physical information carrier and a data management system.

BACKGROUND OF THE INVENTION

In an archive, data are organized by means of files in the form of, for example, folders or binders. To be able to quickly find and manage data organized in such an archive, data is usually digitized and saved in a digital memory.

To allocate a physical file, i.e. for example, a folder filled with documents, to a corresponding virtual folder in a digital memory, the physical file must be identified and clearly allocated to a virtual folder. To do so, in accordance with prior art, methods are used with which in an elaborate fashion, i.e. in particular in a manual process, an identifier of the physical file is allocated to an identifier of the virtual folder. Accordingly, to find the file in the digital memory, the identifier of the corresponding folder must be known, or to find the file in an archive, the identifier of the file must be known.

Especially in large archives in which several employees manage related files, with a manual allocation of files to corresponding folders, situations may arise in which an identifier for a file was incorrectly allocated or was allocated twice or, due to an incorrect allocation, a folder can no longer be found in a memory, resulting in the loss of information.

SUMMARY OF THE INVENTION

Given this background, a method is presented for allocating at least one digital memory location to a physical information carrier. According to the presented method, it is provided that with the use of an application executed on at least one portable processing unit, at least one memory location on a server is requested via a communication interface connected to the at least one portable processing unit. Furthermore, it is provided that the server allocates to the at least one memory location a unique identifier, and that to the unique identifier at least one pattern is allocated that is to be applied manually to a surface of a physical information carrier. It is furthermore provided that the at least one pattern is applied by a user manually to a surface of a physical information carrier, whereby the at least one memory location on the server is connected to the physical information carrier, and, if the at least one pattern is captured by using at least one sensor of the at least one portable processing unit, the allocation of the at least one memory location to the unique identifier is downloaded from the server, and wherein the at least one memory location is accessed via the at least one portable processing unit by using the downloaded allocation.

Embodiments of the presented invention result from the description and the dependent claims.

In one possible embodiment, the presented method serves as automated management of data in an archive comprising a digital memory as well as also storage space to store physical files. According to the presented method it is provided that to a physical information carrier, i.e. for example a file, in an automated process a digital memory location is allocated. It is provided that the allocation of the physical information carrier to the corresponding digital memory location is managed centrally by a server by using a unique identifier, so that an incorrect allocation of physical information carriers to memory locations, for example due to an identifier being allocated twice, can be avoided.

According to the presented method, it is provided that at least one portable processing unit with an application executed on the portable processing unit is configured so as to request a memory location via a communication interface from a server with an active communication connection to the portable processing unit. The at least one portable processing unit could be a smartphone, a laptop, a handheld device, a wearable device, a smart watch, a smart glass, a tablet PC or any other portable device suitable to communicate with a server. The portable processing unit is configured to exchange data with the server via a communication interface such as for example a mobile phone network, a WLAN-based network, a Bluetooth connection, a Nearfield Communication connection, a cable or any other communication interface suitable to transfer data. In particular, the at least one portable processing unit could be a mobile end device (mobile terminal device) with a display unit and/or a camera function and/or a capacitive sensor and/or a microphone and/or a speaker and/or a GPS sensor and/or a NFC function. It is conceivable that a single portable processing unit could be selected to provide a pattern and to access a corresponding memory location. It is of course also conceivable that the pattern be provided by means of the first portable processing unit, and that access to a corresponding memory location is given by means of a second, a third or any other processing unit that differs from the first processing unit.

The application according to the invention configures the portable processing unit according to the invention to carry out the method according to the invention so that by means of the application the commands required to carry out the method according to the invention can be transmitted to the respective portable processing unit and, as a result, to the server that was provided according to the invention (if applicable).

In the context of the invention on hand, the surface of a physical information carrier could be a paper, a file folder, a binder or an envelope, in particular a transparent envelope.

In an additional possible embodiment of the presented method it is provided that the at least one memory location is requested via the at least one portable processing unit from the server in response to a capture process of a marker by the portable processing unit.

It is conceivable that the respective portable processing unit, via the use of the application executed on the portable processing unit, be configured by means of a marker, e.g. by a code, preferably a matrix code, in particular a QR code or a predetermined pattern such as a picture, to automatically request a memory location on the server provided according to the invention. To this end, it is provided that the marker be captured by means of a sensor of the portable processing unit, e.g. an imaging sensor or preferably a camera.

This means that the presented method may be started by the scan process of a marker.

In particular, it is provided that the marker is a template to provide the pattern provided according to the invention on a surface of a corresponding information carrier. This means that the template can be captured by means of a sensor and can be used to start the presented method or to request the at least one memory location provided according to the invention.

In an embodiment of the presented method, a corresponding marker, in particular a marker designed as a template, may comprise a multitude of markings. Such markings can be used during the capture process of the marker in order to capture its alignment. For example, via the first marking on the upper left margin of a marker and the second marking on the lower right margin of the marker, it may be determined where the upper margin or the lower margin of the marker and/or where the left side or the right side of the marker is located. In doing so, it can be provided that corresponding markings of a marker are allocated to a corresponding user so that by means of one particular form or one particular position of corresponding markings, for example, the corresponding user of a physical information carrier allocated to the marker may be identified, such as the manufacturer of the physical information carrier. This means that by means of the corresponding markings provided for a marker, a user may be identified by a folder allocated to the marker, for example, so that the server provided according to the invention and/or the portable processing unit provided according to the invention can be configured while taking into account potentially existing information about the user. The markings may be designed so that they cannot be identified as markings by a human; however, they may be captured by means of a sensor and recognized as markings by a processing unit.

Furthermore, it is conceivable that to request a corresponding memory location by means of a corresponding portable processing unit a designation may be provided for the memory location. For example, it may be provided that a user, by means of the portable processing unit, enters a designation for a memory location on the server provided according to the invention in his portable processing unit, whereupon the portable processing unit transmits the designation to the server and at the same time requests a memory location on the server.

The invention provides that at least one memory location be selected from the server and that a unique identifier be allocated to the at least one memory location in response to a request for a memory location transmitted from a corresponding portable processing unit. Such unique identifier serves the allocation of the at least one memory location to a corresponding physical information carrier.

For the allocation of the unique identifier of the at least one memory location to the physical information carrier, it is provided that the unique identifier be allocated a pattern that is to be applied manually to a surface of the physical information carrier. This pattern is presented to the user so that the user can apply the pattern to a surface of the physical information carrier, e.g. the spine of a folder, or transfer the pattern to the surface.

By means of a manually applied pattern, a physical information carrier can be allocated in a quick and simple fashion to a memory location, in particular without the need for printing and affixing elaborate labels. Accordingly, the presented method is particularly suitable for managing a number of physical information carriers, for example in an archive.

To apply or transfer the pattern according to the invention to a surface of a corresponding physical information carrier, a user may apply the pattern to the surface of the physical information carrier by means of a writing utensil or by means of any other device suitable to create a pattern such as a brush or a scribing tool.

According to a further embodiment of the presented method, it is furthermore conceivable that the pattern be sent by the server as a print template, printed and manually applied to the surface of the physical information carrier. It may also be provided, of course, that the pattern be applied to the surface of the physical information carrier by means of an adjustable stamp.

In the context of the presented invention, a pattern to be applied manually is a pattern that is to be drawn or written onto the surface of a physical information carrier by means of a writing utensil. It is conceivable that the pattern consists of a multitude of areas that are drawn inside or transferred to a template. For example, it can be provided that the template spans a surface area of no more than 9 square centimeters [1.4 square inches] on a surface of a corresponding physical information carrier. Here, an area provided in the template into which a corresponding area of the pattern is to be transferred could have an edge length of no more than 3 millimeters [0.12 inches] on one side or a surface area of 9 square millimeters [0.01 square inches], so that a standard user can fill out a field without filling out or marking an adjacent field and the template of the pattern is suitable to be applied to the spine of a folder with a width of 5 centimeters [1.96 inches]. Accordingly, the pattern is presented to the user in such a way, i.e. on an output device such as a display, that the user may transfer a pattern provided by means of an output device as a physical pattern onto the surface of a corresponding physical information carrier.

It is conceivable that the template be provided in the form of a rectangle, rhombus, honeycomb, square, circle or in any other form suitable to transfer a pattern. Accordingly, corresponding areas provided in the template may also be provided in the form of a rectangle, rhombus, honeycomb, square or circle or in any other form suitable to transfer a pattern.

Since the pattern is allocated to the unique identifier, the pattern that is physically applied to a surface of a corresponding physical information carrier allocates the physical information carrier to the unique identifier and accordingly to the at least one memory location allocated to the unique identifier.

To access a memory location allocated to the physical information carrier by means of the pattern and, for example, to access or edit data stored in the memory location while using a pattern arranged on a surface of a corresponding physical information carrier, it is provided according to the invention that the at least one pattern be captured while using at least one sensor of the at least one portable processing unit provided according to the invention, the allocation of the at least one memory location to the unit identifier is downloaded from the server and information stored in the at least one memory location is displayed on a display unit for processing or for access. Here, the allocation of the at least one memory location to the unique identifier can be stored in the form of a file on the server.

According to the presented method it is in particular provided that digital content be stored in the memory location in such a way that subsequent access or retrieval of such digital content from the memory location is possible by means of a corresponding portable processing unit. To add digital content such as pictures, texts, PDF files, video files, sketches or drawings to a corresponding memory location allocated to a corresponding physical information carrier, a pattern provided on a surface of the physical information carrier is captured by means of a sensor of a portable processing unit configured to carry out the presented method and, while indicating the pattern or a unique identifier corresponding to the pattern, is transmitted together with corresponding digital content to the server provided according to the invention. Here, it can be provided that a date be allocated to the digital content; once reached, the digital content on the server is to be deleted.

When accessing a corresponding memory location while using the presented method, it is in particular provided that a structure of the memory location, i.e. folder structures potentially existing in the memory location, is depicted on a processing unit used to access the memory location. This structure can, for example, be changed, i.e. for example complemented or reduced, while using the processing unit to access the memory location.

In a possible embodiment of the presented method it is provided that access of the at least one portable processing unit to the server be only enabled if a position identified via a positioning system of the at least one portable processing unit corresponds to a position of a list of predetermined positions.

It is conceivable that an option to add or view and/or edit digital content to or in a memory location of the server provided according to the invention be restricted by determining a position of a corresponding processing unit accessing the memory location and by comparing it to a list of predetermined positions. To capture the position of the processing unit, for example a GPS sensor of the processing unit, a WLAN signal or a Nearfield Communication connection provided by corresponding beacons may be used, so that access to the memory location, for example, may only be granted if the processing unit is in a position where the processing unit exchanges information with a Nearfield Communication beacon.

In another possible embodiment of the presented method it is provided that for access to the application and/or the server the user be authenticated by means of the at least one portable processing unit while using an authentication procedure of the following list of authentication procedures or a combination thereof: Capturing of biometric features of the user, capturing of an iris structure of the user, capturing of a fingerprint of the user, capturing of language characteristics of the user, capturing of facial features of the user, prompting of an identification key and prompting of a digital key to be provided by means of a data carrier.

In another possible embodiment of the presented method it is provided that access to the memory location be only granted to users from a list of predetermined users while using the at least one pattern.

Access to the memory location may, of course, also be restricted by an administrator to certain persons provided in a list. Here it can be provided that corresponding persons accessing the memory location must authenticate themselves with the server by means of a password and/or a biometric feature, such as a fingerprint or an iris pattern.

Furthermore, it is conceivable that access to the memory location be restricted by an administrator to certain times provided in a list. This means that the memory location can be accessed or that corresponding documents stored in the memory location can be edited only during predetermined times, for example during opening hours of an office.

In a possible embodiment of the presented method it is provided that the at least one pattern be produced by the server and is then transmitted to the at least one portable processing unit requesting the at least one memory location.

In particular, it is provided that the pattern provided according to the invention be produced by the server while using a corresponding unique identifier produced by the server. To do so, a server may use a characteristic number of the unique identifier such as the sum of all digits or a check digit of the unique identifier according to a provided allocation scheme to generate a pattern, in particular a graphic pattern. Through the allocation scheme, the unique identifier is firmly allocated to a corresponding pattern so that the pattern is indicative of the unique identifier and the unique identifier is indicative of the pattern if the allocation scheme is known.

In the event that a corresponding pattern is produced by a corresponding server, it can be provided that only the pattern be transmitted to a corresponding portable processing unit, so that the unique identifier itself is only stored on the server.

In another possible embodiment of the presented method it is provided that the unique identifier be transferred from the server to the at least one portable processing unit requesting the at least one memory location, and that the at least one pattern is produced by the at least one portable processing unit while using the unique identifier.

It can also be provided, of course, that a corresponding portable processing unit be used to produce a corresponding pattern. To do so, the server can transmit a corresponding allocation scheme together with the unique identifier to the portable processing unit. Alternatively, the allocation scheme can also already be saved on the portable processing unit. It is conceivable that different allocation schemes are stored on the portable processing unit and that the server, together with the unique identifier, transmits information to the portable processing unit as to which allocation scheme is to be used to produce the pattern.

To enable a dynamic management of the memory of the server provided according to the invention, it can be provided that a memory location where information is stored pertaining to a physical information carrier be changed and transferred to a new drive, for example. To maintain the allocation of the memory location on the new drive to the corresponding pattern or to a corresponding unique identifier, a protocol can be stored on the server that allocates the memory location on the new drive to the unique identifier if the memory location is to be accessed by means of a corresponding portable processing unit while using the unique identifier. To do so, a file stored as allocation on the server can be updated or complemented, for example.

In another possible embodiment of the presented method it is provided that, after the at least one pattern is applied to the surface of the physical information carrier, the at least one pattern be captured by means of the at least one sensor of the at least one portable processing unit and is compared for verification purposes to the at least one pattern allocated to the unique identifier. Here, it is furthermore provided that if the at least one pattern captured by the at least one sensor deviates from the at least one pattern allocated to the unique identifier in such a way that an allocation of the pattern captured by the at least one sensor to the unique identifier is carried out incorrectly, a new unique identifier is requested via the at least one portable processing unit from the server.

It is provided that the server selects the new unique identifier in such a way that at least one new pattern can be allocated to it that is to be produced while using the at least one pattern captured by means of the at least one sensor. This means that a corresponding pattern captured by means of the at least one sensor is integrated or included in a corresponding new pattern and, together with parts complementary to the pattern captured by means of the at least one sensor forms the new pattern. Furthermore, it is provided that while using the at least one pattern captured by means of the at least one sensor, at least one new pattern be allocated to the new unique identifier and that the at least one pattern applied to the surface of the physical information carrier be complemented according to the at least one new pattern. It is, of course, also conceivable that an alternative pattern is selected as the new pattern which is produced independently of a corresponding incorrect pattern. To use an alternative pattern the incorrect pattern is to be discarded and to be made unrecognizable, for example.

To avoid unnecessary waste and to use the physical information carrier despite an incorrect pattern for the execution of the presented method, it is in particular provided that the incorrect pattern be converted into a valid pattern. It is provided that a new unique identifier be generated if the allocation of a pattern to a memory location is not working, for example during the verification process, or if an incorrect result is produced. Here, it is provided that the new unique identifier be selected in such a way that it can be allocated a new pattern while using a corresponding allocation scheme, comprising the at least one pattern captured by the at least one sensor as part of the new pattern. This means that the incorrect pattern is integrated into the new pattern. To do so, the incorrect pattern is complemented via certain additions to the new pattern, for example. These additions are to be applied by the corresponding user to the surface of the physical information carrier so that the new pattern is created from the incorrect pattern on the surface of the physical information carrier.

To detect an incorrect pattern, it can be provided that, after a user has applied a corresponding pattern onto a surface of a corresponding physical information carrier, the pattern on the surface of the physical information carrier be captured in a verification process and reviewed regarding its suitability to request a corresponding memory location. Should the pattern not lead to the request of the corresponding memory location, it can be assumed that the pattern is incorrect.

To communicate to the corresponding user, those additions or those characteristics that are to be added to a corresponding incorrect pattern to create a new pattern can be depicted on a display unit in a way that highlights them compared to the incorrect pattern. Here, these additions may be highlighted graphically or acoustically, for example in color or in a blinking fashion or in any other technically suitable fashion.

When producing a new unique identifier in response to an incorrect pattern, it can be provided that the new unique identifier be generated from scratch or complemented to a new unique identifier while using an original unique identifier. To complement an original unique identifier, it can be extended by an addition, for example. Here it is in particular provided that the addition be randomly selected to avoid the systematic creation of new patterns by the user.

In another possible embodiment of the presented method it is provided that the at least one new pattern be generated by the server.

In the event that a corresponding new pattern is generated by the server provided according to the invention, e.g. by a cloud server or by a multitude of interconnected server units, it is in particular provided that a corresponding incorrect pattern be captured by means of a sensor of a corresponding portable processing unit, such as an imaging sensor, particularly a camera, and be transferred to the server. While using the incorrect pattern, the server can produce a new identifier and, if applicable, a new pattern.

In another possible embodiment of the presented method it is provided that the at least one new pattern be produced by the at least one portable processing unit.

In the event that the new pattern is produced by the at least one portable processing unit provided according to the invention, it is required that the server transfers a corresponding new unique identifier to the at least one portable processing unit while using the original unique identifier that is allocated to a corresponding incorrect pattern. While using the new unique identifier, the at least one portable processing unit can arrange a new pattern according to the corresponding allocation scheme of the new unique identifier.

It is conceivable that a dialog field is depicted for a user when detecting an incorrect pattern in which the user can chose between a new pattern that complements the incorrect pattern and an alternative pattern that was created independently of the incorrect pattern.

During the manual transfer of a corresponding pattern to a surface of a physical information carrier, it may occur that the corresponding pattern is not exactly reproduced on the surface of the physical information carrier and that an allocation of the pattern to a corresponding unique identifier or to a corresponding memory location is not possible. This can occur due to an imperfectly filled-in template, for example, where certain areas were filled in in an imperfect fashion. To correct an incorrect pattern and to continue using it to execute the presented method, it is provided that the incorrect pattern be complemented to a new pattern. Alternatively, the incorrect pattern may be discarded and a new pattern may be produced.

In another possible embodiment of the presented method it is provided that the at least one pattern to be applied manually to the surface be marked by means of a template to be applied to the surface of the physical information carrier.

By means of a template such as a stencil or a pre-printed form or in the form of a matrix, a field or a form where a pattern is entered, for example, the pattern that may be depicted on a display can be transferred in a quick and precise fashion to a surface of the corresponding physical information carrier. Here, it can be provided that the template be projected onto the surface of a corresponding physical information carrier by means of a projection device in order to provide the pattern.

In another possible embodiment of the presented method it is provided that the template comprises a number of fields to be marked and that on the at least one portable processing unit, those fields which are to be marked manually are displayed as marked, in order to provide at least one pattern that is currently allocated to the unique identifier.

An arrangement of fields that are to be filled by a user or "colored in", for example, is suitable as a template. Here, the stencil could be provided pre-printed or scribed on a surface of a corresponding physical information carrier.

It is conceivable that a template for the manual production of a pattern shows an identification scheme that enables the user to identify the corresponding areas of the template that are to be filled in. Such an identification scheme may comprise numbers that are allocated to corresponding areas of the template, for example, and that are indicated to the user during the depiction of a corresponding pattern so that the user may easily and quickly identify the areas that are to be filled out in order to generate the pattern.

In another possible embodiment of the presented method it is provided that the template be generated by the server and sent as a print template to a recipient.

To provide a corresponding pattern on any surface, it can be provided that a template be generated that is specifically created for the corresponding pattern and that is sent as a print template to a recipient, for example a processing unit or a printer of a user. Here, the template could depict the pattern so that the pattern can be cut out of the template in order to create a stencil for the corresponding pattern.

Furthermore, in a possible embodiment of the presented method, it is conceivable that the template directly depicts the pattern and that it is applied to a surface of a corresponding physical information carrier, i.e. affixed to its surface, for example.

In another possible embodiment of the presented method it is provided that the at least one pattern be applied onto the surface of the physical information carrier by means of capacitive paint.

By means of a pattern provided by capacitive paint on a surface of a corresponding physical information carrier, the pattern can be captured in a quick and precise fashion while using a capacitive sensor of a portable processing unit configured to execute the presented method. To do so, the touchscreen of the portable processing unit may be pressed onto the pattern, for example, so that the touchscreen comes into contact with the pattern and the capacitive paint interacts with the touchscreen to control the portable processing unit. Here, it can be provided that commands are transmitted via a corresponding pattern to the portable processing unit, for example to the effect that content stored in a memory location allocated to the corresponding pattern is automatically depicted on the portable processing unit.

It is conceivable that automatically captured data of a corresponding physical information carrier, such as data read out via a scanning center, is automatically transmitted to a memory location allocated to the physical information carrier. To do so, an identifier allocated by the scanning center to the physical information carrier can be allocated to a unique identifier that is stored on the server and allocated to the physical information carrier, while the unique identifier used by the scanning center, for example, is transmitted to the server. Accordingly, the scanning center can access the memory location on the server via transmission of the identifier used by the scanning center and can store digital content there.

Alternatively, it is conceivable that the server accesses the scanning center to automatically transfer data that is captured via the scanning center by a corresponding physical information carrier to a corresponding memory location that is allocated to the physical information carrier or a unique identifier of a pattern provided on the physical information carrier. To enable the allocation of data captured by the scanning center to the corresponding memory location, a service may be used that could be executed on a client server and that comprises an allocation table where identifiers used by the scanning center are allocated to corresponding identifiers used by the server.

Furthermore, it can be provided that the server provided according to the invention be configured by means of an export function to automatically transmit content selected in a memory location to selected addresses. To do so, the server may send an email or establish a communication connection to another server or a processing unit.

It is in particular provided that a communication connection for the exchange of information between the server provided according to the invention and the at least one portable processing unit provided according to the invention be operated via a secure connection such as an SSL connection.

In another possible embodiment of the presented method it is provided that an alphanumeric character string be selected as the at least one pattern.

The pattern provided according to the invention can be an alphanumeric character string e.g. a sequence of letters, of numbers or a sequence of random characters. In the event that an alphanumeric character string is corrected, it is in particular provided that a provided incorrect character string is complemented by another character to form a valid character string.

In another possible embodiment of the presented method it is provided that a graphic pattern be selected as the at least one pattern.

A graphic pattern, e.g. a rhombus, a square, a rectangle, a circle or any other geometric form can be captured especially well by an optical sensor and is therefore suitable to produce the pattern provided according to the invention. Here, it can be provided that different geometric forms be combined into one pattern.

In another possible embodiment of the presented method it is provided that an amount be stored in the at least one memory location by means of the application executed on the at least one portable processing unit. Here, it is provided that a token is selected that is to be designated by the at least one pattern as the physical information carrier.

To allocate a value to a physical information carrier such as a letter, a stamp, an admission ticket, a coupon, a waste token, a discount ticket, a ticket or any other token by means of the presented method, i.e. to attach a credit balance to a corresponding token, it is provided that a user identifies an amount by means of the at least one portable processing unit provided according to the invention and transfers such to the server provided according to the invention, whereupon the server stores the amount in a memory location selected by the server on the server. To allocate the selected memory location to the token, the server produces a unique identifier. On the basis of the unique identifier, for example via the server or the at least one portable processing unit, a pattern is produced. The pattern is presented to the user and is applied to the token manually by the user so that by capturing the pattern on the token, the amount stored in the memory location on the server can be accessed and edited if applicable. Here, it is conceivable that the server is given a list providing which users may access and view the memory location and which users may edit the memory location, so that a seller, for example, can see the amount in the memory location but cannot edit it, while a user, for example while using a previously acquired activation code, can change the amount in the memory location into another, for example a higher amount. Accordingly, a token that has once been marked with a pattern can be allocated different amounts at different times, so that a voucher could be used partially by dynamically adjusting the corresponding amount allocated to the voucher in the corresponding memory location.

It is conceivable that another template provided on a corresponding physical information carrier comprises a safety feature that is used for authentication to avoid a random copy of a corresponding template. The safety feature could be a security code, particularly a highly encrypted data matrix code. The safety feature can also be a pattern with specific physical, graphic and optical features or colors, such as a digital noise pattern, twisted screen dots, color-shifting inks, invisible inks, holograms, taggants or watermarks. In order to execute an authentication procedure, the security pattern can be captured together with a pattern transferred into the template by means of the sensor provided according to the invention and transmitted to the sensor provided according to the invention. The security pattern could be a bar code.

Furthermore, the presented invention pertains to a data management system with at least one server and at least one portable processing unit, wherein the at least one portable processing unit is configured via an application executed on the at least one portable processing unit so as to request on the server connected in a communicative fashion to the at least one portable processing unit via a communication interface at least one memory location, and wherein the server is configured in a way that it shall select at least one memory location on the server in response to the request of the at least one memory location via the at least one portable processing unit and allocate to the at least one memory location a unique identifier and transfer the unique identifier to the at least one portable processing unit, and wherein the server and/or the at least one portable processing unit are configured so as to allocate to the unique identifier at least one pattern that is to be applied manually to a surface of a physical information carrier. Here, it is provided that the at least one portable processing unit be configured to depict the at least one pattern for the user and to instruct the user to apply the at least one pattern manually to the surface of the physical information carrier so that by means of the at least one pattern to be applied to the surface of the physical information carrier the at least one memory location on the server is connected to the physical information carrier. Furthermore, it is provided that the at least one portable processing unit be configured in a way that, if the pattern is captured while using at least one sensor of the portable processing unit, it shall download the allocation of the at least one memory location to the unique identifier from the server and enable access to the at least one memory location. The presented data management system serves in particular the execution of the presented method.

In a possible embodiment of the presented data management system it is provided that the physical information carrier be a token and that in the at least one memory location an amount of the token be stored. Here, it is provided that the server be configured to only grant access to the amount stored in the memory location to users from a predetermined list of users.

A secure payment system can be provided by using tokens and a restriction of access to a memory location allocated to a token. Here, it can of course be provided that in a memory location allocated to a corresponding token or a corresponding physical information carrier, payment information of a user, such as credit card or bank account information, is stored so that a token itself can be used as a credit card.

Additional advantages and embodiments result from the description and the attached drawings.

It is understood that the aforementioned cited features and the features still to be explained hereafter are not only usable in the corresponding cited combinations, but also in other combinations or as a stand-alone feature without leaving the context of the invention on hand.

BRIEF DESCRIPTION OF THE DRAWINGS

The invention is schematically depicted by means of embodiments in the drawing and is described schematically and to the full extent while making reference to the drawing.

DETAILED DESCRIPTION OF THE INVENTION

Figure 1:
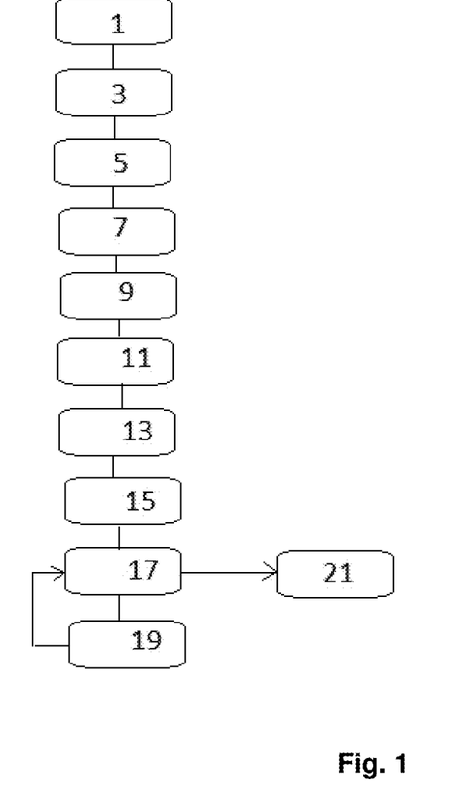
FIG. 1 shows a schematic depiction of a possible embodiment of the presented method.

FIG. 1 shows a flow chart that illustrates the process of the presented method in detail. To allocate data on a server to a physical information carrier in the form of a folder of a file, an application which may be downloaded from the internet or from any other technically suitable environment is executed or installed on a portable processing unit in a configuration step 1. The application thereby configures the portable processing unit to execute the presented method.

As soon as the portable processing unit is configured by means of the application, a user may start the presented method and may register on the portable processing unit in a registration step 3, for example while stating a user ID, a customer number and a password. It is conceivable that the password be provided by a server connected to the portable processing unit and, if applicable, be complemented in an optional authentication step 5 via additional features such as a fingerprint, a language pattern, a facial feature or an iris pattern.

In a request step 7, the portable processing unit requests from the server a memory location. In response to such a request of the portable processing unit, the server selects a memory location and transmits a corresponding signal to the portable processing unit in order to indicate that the memory location was provided. While requesting the memory location, the user may indicate the minimum size of the memory location and how the memory location is to be designated. The designation may also be suggested by a server or may be selected according to a certain logic of a physical storage system for the management of the physical information carrier.

In an identifying step 9, a unique identifier is allocated to the memory location provided on the server and stored on the server.

In a pattern step 11, the unique identifier produced in the identifying step 9 is allocated a pattern that is to be applied manually to a surface of the physical information carrier. This means that the pattern is designated via areas that can be reproduced by the user on the surface of the physical information carrier, for example by means of a writing utensil, in order to transfer the pattern to the surface of the physical information carrier by filling out, checking or marking corresponding areas of the pattern in any other fashion, for example in a template provided on the surface of the physical information carrier.

In a transmitting step 13, the pattern that was assigned to the unit identifier in the pattern step 11 is transmitted to the portable processing unit.

Alternatively, the unique identifier allocated to the memory location in the identifying step 9 can be transferred to the portable processing unit and the pattern can be allocated to the unique identifier via the portable processing unit.

In a transfer step 15, the pattern is presented to a user and transferred by the user to the surface of the physical information carrier by providing, for example, the pattern by means of a writing utensil in a template on the surface of the physical information carrier. To do so, the template may comprise a number of fields that are to be filled out by means of the writing utensil depending on the pattern. After the pattern is transferred to the surface of the physical information carrier, the physical information carrier is allocated to the memory location on the server by the pattern and vice versa.

The pattern on the surface of the physical information carrier can be captured by means of a sensor of the portable processing unit and can be used to access the memory location in an optional validation step 17 in order to test the pattern applied to the surface of the physical information carrier. Should access to the memory location fail, the pattern on the surface of the physical information carrier is recognized as incorrect and an error message is issued. In such a case, the method is continued with a correction step 19. If access to the memory location is executed correctly, the memory location can be edited in an editing step 21, i.e. be filled with digital content, for example.

In the correction step 19, the pattern that was incorrectly applied to the surface of the physical information carrier is corrected. To do so, a new unique identifier is requested by the server. The new unique identifier is selected so as to correspond to the new pattern that comprises the incorrect pattern, so that the incorrect pattern can be added to the new pattern. To do so, the incorrect pattern that was already captured in the validation step is transferred to the server. The server then analyzes the incorrect pattern and generates an identifier that corresponds to the new pattern. Afterwards, the server generates the new pattern and transfers the new pattern to the portable processing unit. Subsequently, those areas are depicted in a highlighted fashion on the portable processing unit where the incorrect pattern is to be complemented to produce the new pattern. The user complements these areas on the surface of the physical information carrier in order to provide the new pattern on the surface of the physical information carrier. Afterwards, the new pattern is tested again in a new validation step 17.

Figure 2:
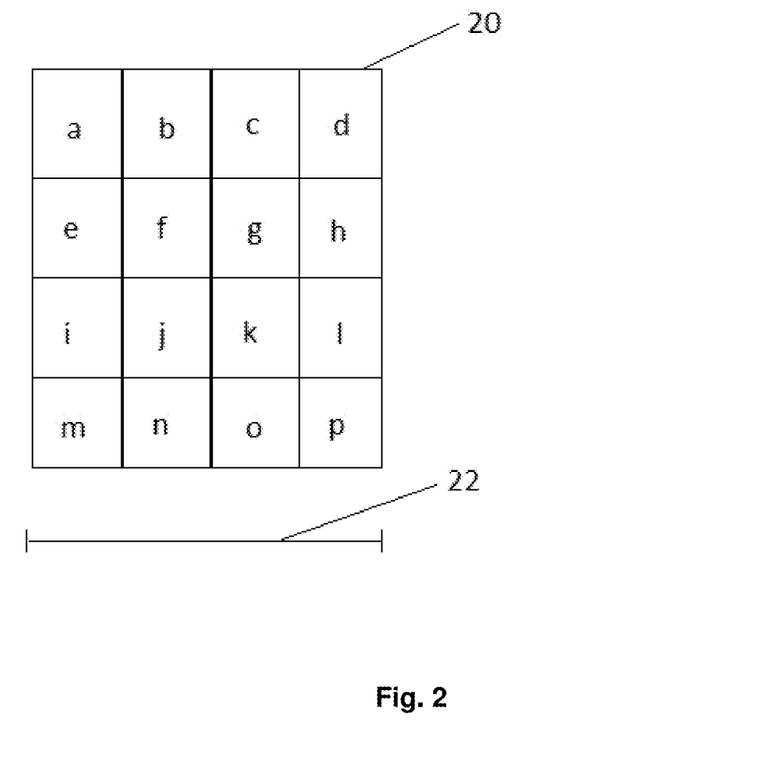
FIG. 2 shows a schematic depiction of a template provided for the execution of a possible embodiment of the presented method.

In FIG. 2, a template 20 is depicted. The template 20 comprises 16 areas a to p. The template could be affixed to the spine of a folder. The template could have an edge length of 3 centimeters [0.12 inches] as indicated by the scale 22 depicting a length of 3 centimeters.

Figure 3:
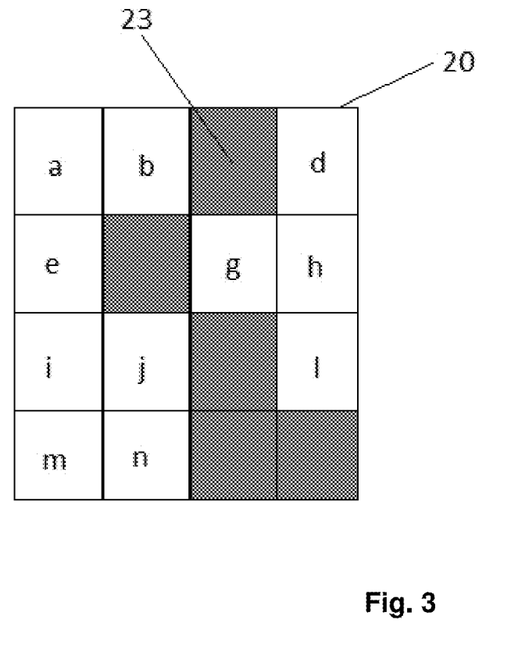
FIG. 3 shows a pattern transferred to the template from FIG. 2 as it is provided for the execution of a possible embodiment of the presented method.

To allocate the folder to a digital memory location on a server, corresponding areas of the areas a to p can be filled out using a writing utensil so that a pattern is created within the template, as shown in FIG. 3, for example.

In FIG. 3 a pattern 23 is depicted that was drawn into the template 20 according to FIG. 2. To do so, the areas c, f, k, o and p were filled out. The pattern 23 can be captured by means of a sensor, such as an imaging sensor, in particular a camera, and used to access the memory location on the server.

Figure 4:
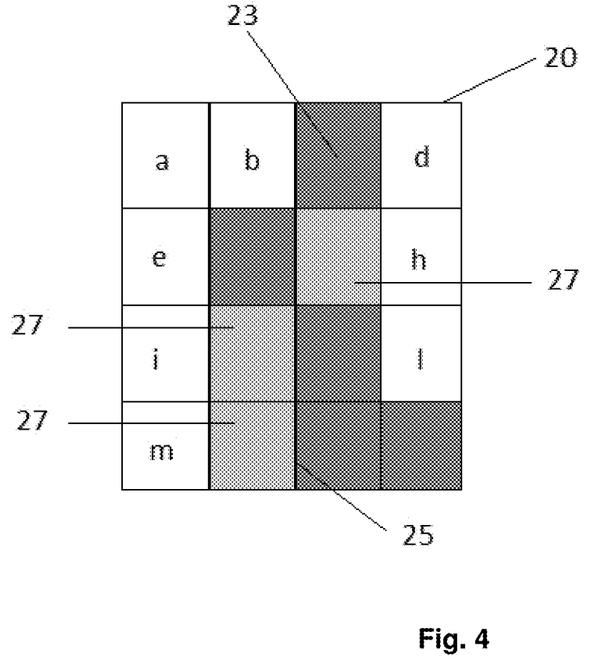
FIG. 4 shows a pattern that was complemented to form a new pattern on the basis of the pattern from FIG. 3 as it is provided for the execution of a possible embodiment of the presented method.

In FIG. 4, a new pattern 25 is depicted that was created using pattern 23. To do so, the areas j, n and g were filled out as indicated by the areas 27 lightly shaded for the purpose of depiction. The additionally filled out areas j, n and g can, of course, also be filled out in the same color that was used to fill out the areas c, f, k, o and p of the pattern 23.

Figure 5:
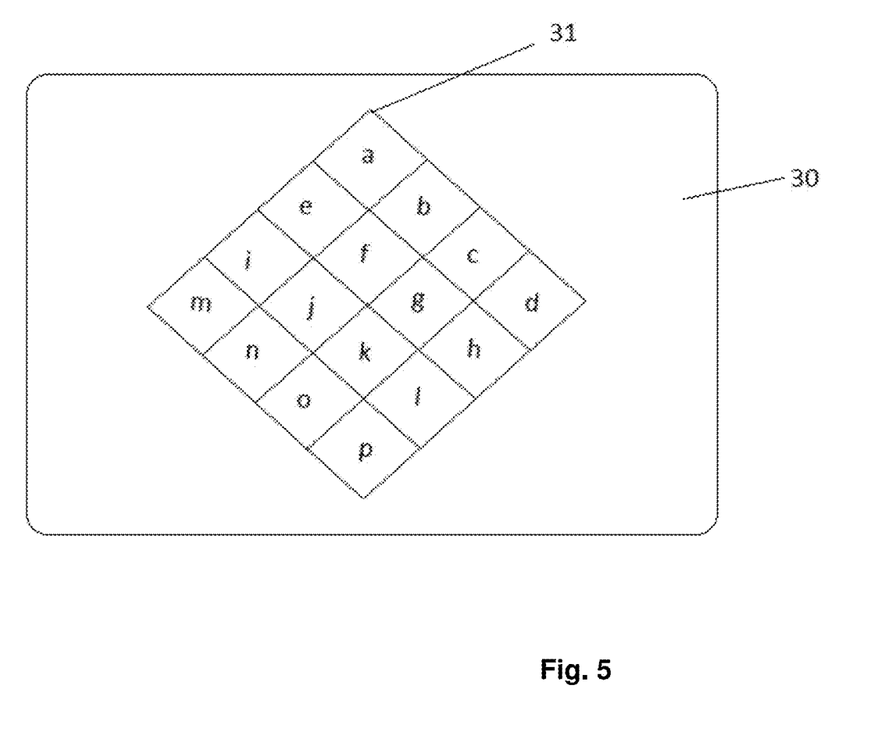
FIG. 5 shows a token provided for the execution of a possible embodiment of the presented method.

In FIG. 5, a token 30 in the form of a letter is depicted. To fill the token 30 with an amount, a template 31 is filled out with a pattern on token 30. To do so, by means of a possible embodiment of the application provided according to the invention and executed on a portable processing unit, an amount consisting of a multitude of depicted amounts is selected by the user of the portable processing unit or is manually entered in a first step. For example, the user may select 70 cents for standard postage.

As soon as the amount is defined by the user, the amount is transmitted from the portable processing unit to the server provided according to the invention and, as a result, a memory location is requested on the server. The server then selects a memory location and stores information regarding the amount and the user there. To do so, the server can request information regarding the user from the application, such as payment information, identification data, or request such information from the user via the application while using a dialog field to be depicted on the portable processing unit.

As soon as the memory location is selected by the server, the memory location is allocated a unique identifier. This identifier is then used to produce the pattern to be inserted into the template 31. To do so, the server can generate the pattern according to a predefined allocation rule or according to a random algorithm from the unique identifier and transmit it to the portable processing unit. Alternatively, the server can transmit the unique identifier to the portable processing unit; and the portable processing unit then generates the pattern, for example by means of a predefined allocation rule or according to a random algorithm, and transmits it to the server. As soon as the pattern is available on the portable processing unit, the pattern can be displayed to the user so that the user can manually transfer the pattern into the template 31. To do so, it is specified to the user which areas a to p are to be manually filled out in the template 31, for example by displaying a character sequence. In the case on hand, the user may be instructed to successively connect the areas p, k, n, i, e, a, b, f, j, o, l and g.

Figure 6:
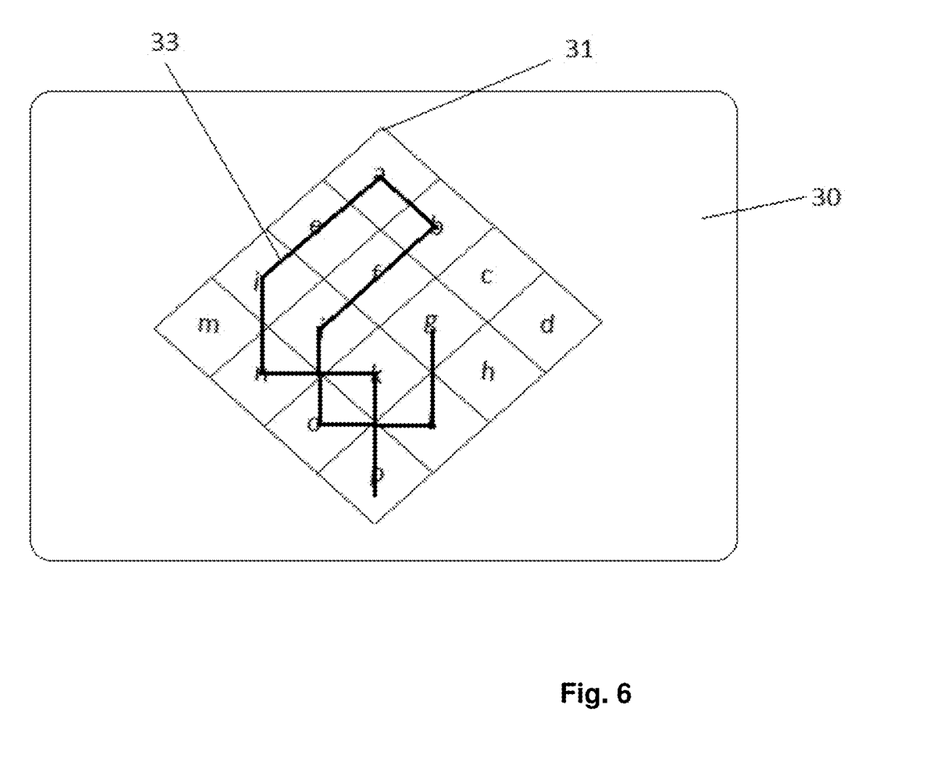
FIG. 6 shows the token from FIG. 5 with a pattern that was identified in accordance with a possible embodiment of the presented method.

In FIG. 6, the token is depicted with a filled out template 31. By entering the aforementioned pattern in form of a line 33 to be inserted into the template 31, the token 30 is allocated to the memory location selected on the memory location and accordingly to the amount stored in the memory location, as well as further information such as information about the user where applicable. In the present case, the amount of 70 cents was allocated to the token.

To see or edit the information stored in the memory location on the server, the pattern can be captured by the portable processing unit by means of a sensor, such as an imaging sensor, in particular a camera, while using the application. From the pattern, the application infers a corresponding unique identifier which it transmits to the server or it transmits the pattern to the server so that the server may link the pattern to a unique identifier corresponding to the pattern. To do so, the application can comprise an allocation rule which provides how to link a pattern to a corresponding identifier. Alternatively, the application can transmit the captured pattern or, for example, a picture of the pattern to the server so that the server can compare the captured pattern with corresponding patterns produced by the server. By means of the unique identifier, the server can determine the memory location allocated to the unique identifier and display the content stored in the memory location, i.e. transmit such to the portable processing unit or another predefined recipient by means of an email, for example.

Accordingly, while using the pattern, the memory location allocated to the pattern or the memory location allocated to the unique identifier that in turn is allocated to the memory location can be accessed. This means that the amount that is allocated to the token 30, for example, can be changed retroactively, i.e. after a first allocation of an amount. A user allocated to the token 30 may, of course, also be changed. Furthermore, additional information in the memory location that can be determined by means of the pattern, such as a recipient of the letter or payment information of the user, can be stored or changed. Here, it can be provided, of course, that at least a portion of the information stored in the memory location that can be determined by means of the pattern can be accessed and/or edited only while using an authentication measure. In the present case, a postal operator which is authenticated on the server can scan the pattern of the letter, for example and can access the amount stored in the memory location to check whether postage was paid.

The invention claimed is:

1. A method for allocating at least one memory location to a physical information carrier, the method comprising:
   by using at least one application executed on at least one portable processing unit, requesting the at least one memory location on a server via a communication interface connected to the at least one portable processing unit;
   via the server, allocating the at least one memory location a unique identifier;
   allocating the unique identifier at least one pattern to be applied manually to a surface of the physical information carrier;
   connecting the at least one memory location on the server to the physical information carrier;
   applying the at least one pattern by a user manually, by drawing or writing, onto the surface of the physical information carrier;
   if the at least one pattern is captured by using at least one sensor of the at least one portable processing unit, downloading the allocation of the at least one memory location to the unique identifier from the server;
   accessing the at least one memory location via the at least one portable processing unit by using the downloaded allocation;
   producing the at least one pattern by the server and transferring to the at least one portable processing unit requesting the at least one memory location;
   transferring the unique identifier by the server to the at least one portable processing unit requesting the at least one memory location;
   producing the at least one pattern by the at least one portable processing unit by using the unique identifier;
   depicting by the at least one portable processing unit the at least one pattern for the user and instructing the user to apply the at least one pattern manually to the surface of the physical information carrier so that by means of the at least one pattern applied to the surface of the physical information carrier the at least one memory location on the server is connected to the physical information carrier; and
   storing by means of the at least one application executed via the at least one portable processing unit an amount of a token in the at least one memory location, and selecting as the physical information carrier the token that is to be designated by the at least one pattern.

2. The method of claim 1, wherein the method further comprises:
   after the at least one pattern has been applied to the surface of the physical information carrier, capturing the at least one pattern applied to the surface of the physical information carrier via the at least one sensor of the at least one portable processing unit and comparing the at least one pattern for verification purposes to the at least one pattern allocated to the unique identifier;
   in the event that the at least one pattern captured by the at least one sensor deviates from the at least one pattern allocated to the unique identifier in such a way that an allocation of the at least one pattern captured by the at least one sensor to the unique identifier is carried out incorrectly, requesting a new unique identifier via the at least one portable processing unit from the server;
   choosing by the server the new unique identifier, whereas the new unique identifier is designed in a way that it is allocated to at least one new pattern comprising the at least one pattern captured via the at least one sensor as part of the at least one new pattern;
   allocating, using the at least one pattern captured by the at least one sensor, the at least one new pattern to the new unique identifier; and
   completing the at least one pattern applied to the surface of the physical information carrier according to the at least one new pattern.

3. The method of claim 2, wherein the method further comprises:
   producing the at least one new pattern by the server or by the at least one portable processing unit.

4. The method of claim 1, wherein the method further comprises:
   producing the at least one pattern to be applied manually to the surface of the physical information carrier by using at least one template to be applied to the surface of the physical information carrier.

5. The method of claim 4, wherein the method further comprises:
   producing the at least one template by the server and transmitting the at least one template as print template to a recipient.

6. The method of claim 4, wherein the at least one template comprises a number of areas to be marked and wherein the method further comprises depicting on the at least one portable processing unit those areas as marked that are to be marked manually in order to provide the at least one pattern currently allocated to the unique identifier.

7. The method of claim 1, wherein access of the at least one portable processing unit to the server is only enabled if a position identified via a positioning system of the at least one portable processing unit corresponds to a position in a list of predetermined positions.

8. The method of claim 1, wherein only users from a predefined list of users are granted access to the memory location by using the at least one pattern.

9. The method of claim 1, wherein the method further comprises requesting the at least one memory location by the server via the at least one portable processing unit in response to a capture process of a marker by the at least one portable processing unit.

10. The method of claim 1, wherein the method further comprises selecting an alphanumeric character string as the at least one pattern.

11. The method of claim 1, wherein the method further comprises selecting a graphic pattern as the at least one pattern.

12. A data management system, comprising:
   at least one server;
   at least one portable processing unit comprising at least one sensor;
   the at least one portable processing unit, by an application executed on the at least one portable processing unit, requesting, by the at least one server connected in communication to the at least one portable processing unit via a communication interface, at least one memory location;

the at least one server selecting at least one memory location on the at least one server in response to a request of the at least one memory location via the at least one portable processing unit and allocating to the at least one memory location a unique identifier and transfer the unique identifier to the at least one portable processing unit;

the at least one server or the at least one portable processing unit allocating to the unique identifier at least one pattern applied manually to a surface of a physical information carrier;

the at least one portable processing unit depicting for a user the at least one pattern and to instruct the user in regard to the manual application of the at least one pattern on the surface of the physical information carrier so that, using the at least one pattern to be applied to the surface of the information carrier, the at least one memory location on the at least one server is connected with the physical information carrier;

the at least one portable processing unit, if the pattern is captured by using the at least one sensor of the at least one portable processing unit, downloading the allocation of the at least one memory location to the unique identifier from the at least one server and enable access to the at least one memory location;

the at least one portable processing unit depicting the at least one pattern for the user and to instruct the user to apply the at least one pattern manually to the surface of the physical information carrier so that by means of the at least one pattern applied to the surface of the physical information carrier the at least one memory location on the at least one server is connected to the physical information carrier; and the at least one server producing the at least one pattern and transferring the at least one pattern to the at least one portable processing unit requesting the at least one memory location, or wherein the at least one server transferring the unique identifier to the at least one portable processing unit requesting the at least one memory location and the at least one portable processing unit producing at least one pattern by using the unique identifier, and the at least one portable processing unit depicting the at least one pattern for the user and instructing the user to apply the at least one pattern manually, by drawing or writing, to the surface of the physical information carrier so that by means of the at least one pattern applied to the surface of the physical information carrier the at least one memory location on the at least one server is connected to the physical information carrier;

wherein the physical information carrier is a token and wherein in the at least one memory location an amount of the token is stored; and the at least one server granting only users from a predetermined list of users access to the amount stored in the memory location.

\* \* \* \* \*